(12) United States Patent
Yamabana

(10) Patent No.: US 8,676,582 B2
(45) Date of Patent: Mar. 18, 2014

(54) SYSTEM AND METHOD FOR SPEECH RECOGNITION USING A REDUCED USER DICTIONARY, AND COMPUTER READABLE STORAGE MEDIUM THEREFOR

(75) Inventor: Kiyoshi Yamabana, Tokyo (JP)

(73) Assignee: NEC Corporation, Tokyo (JP)

( * ) Notice: Subject to any disclaimer, the term of this patent is extended or adjusted under 35 U.S.C. 154(b) by 1233 days.

(21) Appl. No.: 12/526,465

(22) PCT Filed: Mar. 14, 2008

(86) PCT No.: PCT/JP2008/054705
§ 371 (c)(1),
(2), (4) Date: Sep. 1, 2009

(87) PCT Pub. No.: WO2008/114708
PCT Pub. Date: Sep. 25, 2008

(65) Prior Publication Data
US 2010/0324899 A1    Dec. 23, 2010

(30) Foreign Application Priority Data

Mar. 14, 2007   (JP) ................................. 2007-065229

(51) Int. Cl.
*G01L 15/00*   (2006.01)
(52) U.S. Cl.
USPC .......................................................... 704/251
(58) Field of Classification Search
USPC .................................................. 704/251, 270
See application file for complete search history.

(56) References Cited

U.S. PATENT DOCUMENTS

| 5,950,159 A * | 9/1999 | Knill ............................. 704/251 |
| 6,195,641 B1 * | 2/2001 | Loring et al. ................. 704/275 |
| 6,487,534 B1 * | 11/2002 | Thelen et al. ................. 704/270 |
| 7,099,824 B2 * | 8/2006 | Kushida et al. ............... 704/231 |
| 7,369,988 B1 * | 5/2008 | Thenthiruperai et al. ...... 704/10 |
| 2004/0010409 A1 * | 1/2004 | Ushida et al. ................. 704/246 |

(Continued)

FOREIGN PATENT DOCUMENTS

| JP | 59-107400 A | 6/1984 |
| JP | 11-327583 A | 11/1999 |

(Continued)

OTHER PUBLICATIONS

International Search Report for PCT/JP2008/054705 mailed Jun. 24, 2008.

(Continued)

*Primary Examiner* — Jialong He
(74) *Attorney, Agent, or Firm* — Sughrue Mion, PLLC

(57) ABSTRACT

A speech recognition system for rapidly performing recognition processing while maintaining quality of speech recognition in a speech recognition device, are provided. A speech recognition system includes a speech input device which inputs speech and displays a recognition result, and a speech recognition device which receives the speech from the speech input device, performs recognition processing, and sends back the speech to the speech input device. The speech input device includes a user dictionary section which stores words used for recognizing the input speech, and a reduced user dictionary creation unit which extracts words corresponding to the input speech from the user dictionary and creates a reduced user dictionary. The speech recognition device has a speech recognition unit which inputs the input speech and the reduced user dictionary from the speech input/output device and recognizes the input speech based on the reduced user dictionary and a system dictionary provided beforehand.

23 Claims, 9 Drawing Sheets

(56) References Cited

U.S. PATENT DOCUMENTS

| | | | |
|---|---|---|---|
| 2004/0030543 A1* | 2/2004 | Kida et al. ................. | 704/8 |
| 2004/0181391 A1* | 9/2004 | Inoue et al. ................. | 704/10 |
| 2004/0199394 A1* | 10/2004 | Kuzunuki et al. ........... | 704/277 |
| 2005/0283724 A1* | 12/2005 | Griffin ........................ | 715/532 |
| 2008/0162137 A1* | 7/2008 | Saitoh et al. ................ | 704/251 |

FOREIGN PATENT DOCUMENTS

| | | |
|---|---|---|
| JP | 2000020417 A | 1/2000 |
| JP | 2000075887 A | 3/2000 |
| JP | 2001255885 A | 9/2001 |
| JP | 2002162988 A | 6/2002 |
| JP | 2002215184 A | 7/2002 |
| JP | 2003140682 A | 5/2003 |
| JP | 2003295893 A | 10/2003 |
| JP | 3581648 B | 7/2004 |
| JP | 2005128076 A | 5/2005 |
| JP | 2005227510 A | 8/2005 |
| WO | 2008007688 A | 1/2008 |

OTHER PUBLICATIONS

"C-6-(3) Speech Search", Report of Standard Technologies, Japan Patent Office, 2001, [online] <http://www.jpo.go.jp/shiryou/s_sonota/hyoujun_gijutsu/search_engine/c/c6.htm>.

S. Nakagawa, "Speech Recognition Based on Probability Models", 2nd edition, the Institute of Electronics, Information and Communication Engineers, 1989, Section 3, 3.42 "Phoneme/Syllable/Word Spotting Algorithm".

* cited by examiner

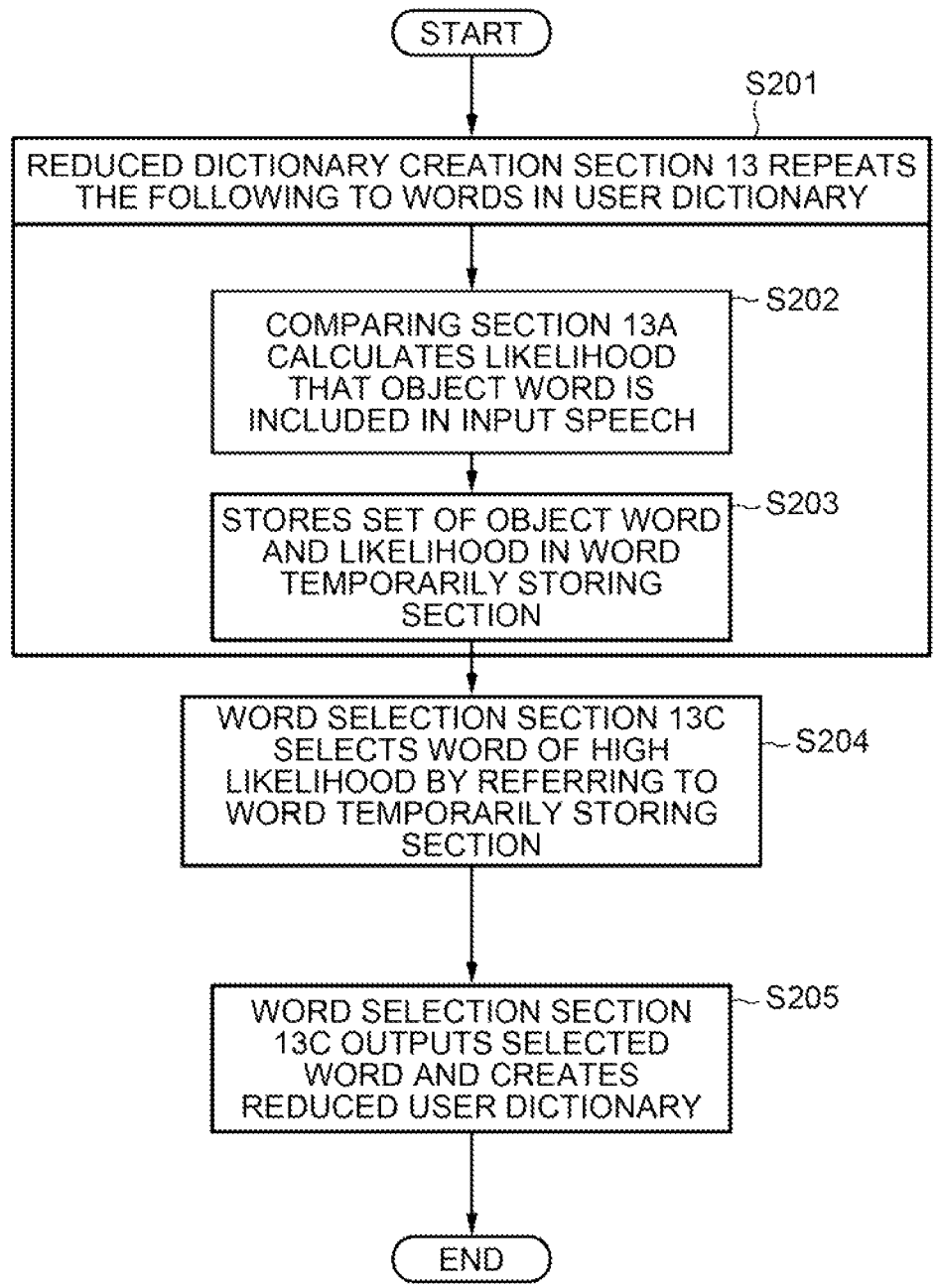

| DESCRIPTION | PRONUNCIATION |
|---|---|
| iisutobirejji | iisutobirejji |
| kuroisutaazu | kuroisutaazu |
| sheisutajiamu | sheisutajiamu |
| sheekusupiagaaden | sheekusupiagaaden |
| jeikobusentaa | jeikobusentaa |
| sentorarupaaku | sentorarupaaku |
| taimuzusukuea | taimuzusukuea |
| buroodowei | buroodowei |
| meishiizu | meishiizu |
| washintonsukuea | washintonsukuea |

| DESCRIPTION | PRONUNCIATION | LIKELIHOOD |
|---|---|---|
| iisutobirejji | iisutobirejji | 0.2 |
| kuroisutaazu | kuroisutaazu | 0.1 |
| sheisutajiamu | sheisutajiamu | 0.8 |
| sheekusupiagaaden | sheekusupiagaaden | 0.6 |
| jeikobusentaa | jeikobusentaa | 0.3 |
| sentorarupaaku | sentorarupaaku | 0.2 |
| taimuzusukuea | taimuzusukuea | 0.15 |
| buroodowei | buroodowei | 0.05 |
| meishiizu | meishiizu | 0.5 |
| washintonsukuea | washintonsukuea | 0.3 |

| DESCRIPTION | PRONUNCIATION |
|---|---|
| sheisutajiamu | sheisutajiamu |
| sheekusupiagaaden | sheekusupiagaaden |
| meishiizu | meishiizu |

| DESCRIPTION | PRONUNCIATION |
|---|---|
| KOKO | KOKO |
| SOKO | SOKO |
| DOKO | DOKO |
| DA | DA |
| DESU | DESU |
| MASU | MASU |
| KA | KA |
| GA | GA |
| WO | WO |
| NI | NI |
| WA | WA |
| MO | MO |
| NYUYOKU | NYUYOKU |
| WASHINTON | WASHINTON |
| NIPPON | NIPPON |
| HAI | HAI |
| IIE | IIE |

SYSTEM AND METHOD FOR SPEECH RECOGNITION USING A REDUCED USER DICTIONARY, AND COMPUTER READABLE STORAGE MEDIUM THEREFOR

TECHNICAL FIELD

The present invention relates to a speech recognition system of a server-client typo, a speech recognition method, and a speech recognition processing program, in which speech is input in a client terminal device and speech recognition processing is performed in a server connected over a network.

BACKGROUND ART

In a speech recognition system of the server-client type, how to arrange a dictionary for speech recognition is an important aspect in design. Considering that an engine performing speech recognition is provided to a server, it is reasonable that a dictionary for speech recognition is provided to the server which is easily accessible from the engine. This is because in a network line connecting a client terminal device (hereinafter referred to as a "client") and a server, data transferring speed is generally lower and costs required for communications are generally higher compared with a data bus which is a data transmission path inside the server.

On the other hand, there is a case where it is desirable to change vocabulary for speech recognition by each client, such as words which are uniquely used by a client. In such a case, it is convenient for management to store a dictionary for speech recognition including words uniquely used by a client on the client side. As such, in a speech recognition system of the server-client type, speech recognition processing is generally proceeded using both a dictionary for speech recognition provided to the server and a dictionary for speech recognition provided to the client. An example of a system for performing speech recognition processing using both a dictionary for speech recognition provided to a server and a dictionary for speech recognition provided to a client has been proposed (see Patent Document 1).

A speech recognition system shown in FIG. 8 includes a client 100 having a speech recognition engine 104 and a recognition dictionary 103, and a server 110 having a speech recognition engine 114 and a recognition dictionary 113. This speech recognition system generally operates as follows. When a speech is input from a speech input section 102, the client 100 refers to the recognition dictionary 103 controlled by a dictionary control section 106 and performs speech recognition processing by the speech recognition engine 104. When the speech recognition processing is performed successfully and a speech recognition result is obtained, the speech recognition result is output via a result integration section 107.

In contrast, when the speech recognition processing is performed unsuccessfully and a speech recognition result is rejected, the client 100 transmits the input speech data to the server 110 by a speech transmission section 105. The server 100 receives the speech data by a speech reception section 112, refers to the recognition dictionary 113 controlled by a dictionary control section 115, and performs speech recognition processing by the speech recognition engine 114. The obtained speech recognition result is transmitted to the client 110 by a result transmission section 116, and is output via the recognition integration section 107.

In summary, if a speech recognition result is obtained by the client itself, the result is used as an output of the speech recognition system, and if a speech recognition result cannot be obtained, the server performed speech recognition processing and a speech recognition result thereof is used as an output of the speech recognition system.

Another example of a system for performing speech recognition processing using a dictionary for speech recognition provided to a server and a dictionary for speech recognition provided to a client has also been proposed (see Patent Document 2). A speech recognition system shown in FIG. 9 includes a client 200 having a storage section 204 storing a user dictionary 240A, speech recognition data 204B, and dictionary management information 204C, and a server 210 having a recognition dictionary 215 and a speech recognition section 214. The client 200 and the server 210 are adapted to perform communications with each other via a communication section 202 of the client 200 side and a communication section 211 of the server side.

This speech recognition system generally operates as follows. Prior to speech recognition processing, the client 200 transmits the user dictionary 204A to the server 210 by the communication section 202. Then, the client 200 transmits the speech data input from a speech input section 201 to the server 210 by the communication section 202. The server 210 performs speech recognition processing by the speech recognition section 214 using the user dictionary 204 received by the communication section 211 and the recognition dictionary 215 managed by a dictionary management section 212.
Patent Document 1: Japanese Patent Laid-Open Publication No. 2003-295893
Patent Document 2: Japanese Patent No. 3581648

DISCLOSURE OF THE INVENTION

Problems to be Solved by the Invention

However the speech recognition systems of the above techniques involve the following problems.

First, in the art described in Patent Document 1, speech recognition processing using the recognition dictionary on the client and the recognition dictionary on the server cannot be performed. This is because in the system of Patent Document 1, speech recognition processing is first performed using only the recognition dictionary on the client, and when speech recognition processing is failed, then speech recognition processing is performed using only the recognition dictionary on the server. As such, in the case where a correct speech recognition result includes a plurality of words, and part of the words are only included in the recognition dictionary of the client side and another part of the words are only included in the recognition dictionary of the server side, a correct speech recognition result cannot be obtained in this system.

Further, in the art of Patent Document 1, speech recognition processing is first performed on the client side and success/failure of the speech recognition processing is determined on the client side, and only when the processing is failed, speech recognition processing is performed on the server side. As such, in the system of Patent Document 1, if the client erroneously determined as successful even though it failed in the speech recognition processing, the result is adopted as a speech recognition result of the entire system. As such, the accuracy of the speech recognition processing performed by the client largely affects the accuracy of the speech recognition processing of the entire system.

However, the resources usable in the client terminal is generally smaller compared with that of the server, and accuracy of the speech recognition processing on the client is generally lower than the case of performing processing in the server. As such, there is a disadvantage that the accuracy of speech recognition as the system is not easily improved.

Further, in the art described in Patent Document 2, prior to speech recognition processing, a recognition dictionary on the client is transmitted to the server, and the server performs speech recognition processing using the transmitted recognition dictionary and the recognition dictionary of its own. In this system, as a large amount of data is transmitted before speech recognition processing, there is a disadvantage that a large amount of communication costs and communication times are needed. Note that Patent Document 2 mentions a method in which an input form identifier is designated and managed for each recognition vocabulary, and speech recognition object vocabulary in the user dictionary is narrowed down using information of an input form of a current input object.

However, the case where this method of narrowing down the speech recognition object vocabulary is adaptable is limited to only when information for narrowing down the speech recognition object vocabulary (in this case, input form information) has been given before speaking. As such, there is a disadvantage that this method is not applicable to a general speech recognition system which cannot use such additional information.

An object of the present invention is to provide a speech recognition system of a server-client type, a speech recognition method, and a speech recognition processing program, capable of rapidly processing speech recognition while maintaining the quality of the speech recognition without increasing the load on the system.

Means for Solving the Problems

In order to achieve the object, a speech recognition system according to the present invention is a speech recognition system for recognizing an input speech converted into an electric signal, including a user dictionary section which stores a user dictionary to be used for speech recognition, a reduced user dictionary creation unit which creates a reduced user dictionary by eliminating words determined as unnecessary for recognizing the input speech from the user dictionary, and a speech recognition unit which adds the reduced user dictionary to a system dictionary provided beforehand, and recognizes the input speech based on the system dictionary and the reduced user dictionary.

A speech recognition method according to the present invention is a speech recognition method for recognizing an input speech converted into an electric signal, including, creating a reduced user dictionary by eliminating words determined as unnecessary for recognizing the input speech from a user dictionary, adding the reduced user dictionary to a system dictionary previously provided, and recognizing the input speech based on the system dictionary and the reduced user dictionary.

A speech recognition program according to the present invention is a speech recognition program for recognizing an input speech converted into an electric signal, in which the program causes a computer of the client terminal device to perform a function of creating a reduced user dictionary by eliminating, from a user dictionary, words determined as unnecessary for recognizing the input speech, and causes a computer of the server to perform a function of adding the reduced user dictionary to a system dictionary provided beforehand and recognizing the input speech based on the reduced user dictionary and the system dictionary.

Effects of the Invention

As the present invention is adapted to transmit an input speech and a reduced user dictionary from a speech input device when speech recognition processing is performed in a speech recognition device, the speech recognition device can perform speech recognition on the input speech based on the reduced user dictionary and the system dictionary while maintaining the quality of the speech recognition. Further, as the reduced user dictionary having smaller data capacity is transmitted, instead of the user dictionary, from the speech input device, the amount of data transmitted to the speech recognition device and the communication costs can be reduced significantly compared with the case of transmitting the entire user dictionary, the data transmission time and the processing time for speech recognition in the speech recognition device can be reduced significantly. Accordingly, speech recognition can be achieved rapidly while maintaining the quality of the speech recognition without increasing the load on the system.

BEST MODE FOR CARRYING OUT THE INVENTION

Hereinafter, exemplary embodiments of the invention will be described based on the accompanying drawings.

First Exemplary Embodiment

An exemplary configuration of a speech recognition system according to a first exemplary embodiment of the invention will be described based on FIG. 1.

In FIG. 1, the speech recognition system according to the exemplary embodiment includes a client terminal device (hereinafter referred to as "client") 10 as a speech input device, and a server 20 as a speech recognition device. The client 10 includes a speech input section 11 which inputs speech, a user dictionary section 12 storing words used for speech recognition, a reduced user dictionary creation section 13 working as a reduced user dictionary creation unit which, regarding input speech, eliminates words determined as unnecessary from the user dictionary section 12 and creates a reduced user dictionary, and a client communication section 14 which transmits input speech and the reduced user dictionary to the server 20. A reference numeral 13D indicates a reduced user dictionary section storing the reduced user dictionary created by the reduced user dictionary creation section 13. Further, a reference numeral 15 indicates a recognition result output section which outputs and displays speech information of a recognition result, having been speech-recognized in the server 20 and transmitted, on the head of a display screen.

The server 20 includes a system dictionary 21 storing words to be used for speech recognition, a server communication section 23 which receives input speech and a reduced user dictionary transmitted from the client 10, and a speech recognition section 22 working as a speech recognition unit which performs speech recognition processing for input speech using the system dictionary and the reduced user dictionary.

As such, in speech recognition processing performed in the server 20 of the exemplary embodiment, a speech recognition result which is the same as the case of using both the system dictionary and the user dictionary can be acquired substantially. Further, the amount of data transferred from the client 10 to the server 20 and communication costs can be reduced compared with the case of transmitting the entire user dictionary.

Specifically, the reduced user dictionary is configured as a dictionary in which words having a high likelihood of being included in input speech are selected from the words stored in the user dictionary 12. The reduced user dictionary creation section 13 compares the words stored in the user dictionary 12 and input speech, calculates the likelihood of the words appearing in the input speech, and selects words of high likelihoods based on the calculation result to thereby create a reduced user dictionary.

Thereby, the differences between the user dictionary and the reduced user dictionary are determined as words of low likelihoods of being included in the input speech, and in the speech recognition processing, a speech recognition result which is the same as the case of using both the system dictionary and the user dictionary is acquired substantially.

Further, processing performed by the client 10 is processing to determine whether the words of the user dictionary have a likelihood of being included in the input speech. In this stage, it is only necessary to be careful of not missing words which actually appear, and this processing does not adversely affect the accuracy of the speech recognition directly.

Further, the reduced user dictionary creation section (reduced user dictionary creation means) 13 creates a reduced user dictionary by means of a word spotting method using the user dictionary 12.

Hereinafter, this will be described in detail. In FIG. 1, the client 10 includes the speech input section 11, the user dictionary 12, the reduced dictionary creation section 13, and the client communication section 14, as described above. Further, the server 20 includes the system dictionary section 21, the speech recognition section 22, and the server communication section 23. The client communication section 14 which performs communications with the server 20 and the server communication section 23 which performs communications with the client 10 are connected over the communication network 120.

In the client 10, the speech input section 11 may be configured of a microphone and an A/D converter, for example. The user dictionary section 12 is formed of a storage section such as a hard disk or a nonvolatile memory, and has a mode of storing dictionary data. The reduced dictionary creation section 13 is adapted to create a reduced user dictionary from the user dictionary while referring to the input speech, and in the exemplary embodiment, is configured of a microprocessor having a random access memory (RAM) and a central processing unit (CPU) which executes computer programs stored in the RAM. The client communication section 14 performs data communications using wired LAN, wireless LAN, or mobile telephones, for example.

The server 20 is formed of a personal computer or the like, for example. The system dictionary section 21 is formed of a hard disk storing a dictionary used for speech recognition, for example. The server communication section 23 performs data communications with the client 10 using a LAN and the like. The speech recognition section 22 performs predetermined speech recognition processing while referring to a system dictionary in the system dictionary section 21. The communication network 120 is configured of wired LAN, wireless LAN or wireless networks used by mobile telephones, for example.

Next, operation of the first exemplary embodiment will be described based on FIG. 2.

First, a user inputs a speech from the speech input section 11 of the client 10 (step S101: speech input step). With the input, the reduced dictionary creation section 13 refers to the speech data input at step S101, and creates a reduced user dictionary from the user dictionary section 12 (step S102: reduced user dictionary creation step).

Specifically, the reduced user dictionary is a dictionary created by selecting words, having high likelihoods of being included in the input speech, from the words included in the user dictionary stored in the user dictionary section 102, and has a characteristic as a partial dictionary of the user dictionary. That is, when a speech to be recognized is input, the reduced user dictionary is created as a dictionary corresponding to the input speech based on the user dictionary of the user dictionary section 102. Although the reduced user dictionary includes partial words of the user dictionary, the information held by each word is the same as that of the user dictionary. The reduced user dictionary, created in such a manner, is stored in the reduced user dictionary section 13D.

Next, the client communication section 14 transmits the speech data input at step S101 and the reduced user dictionary created at step S102 to the server communication section 23 of the server 20 over the communication network 120 (step S103: transmission step).

Then, the server communication section 23 of the server 20 receives the speech data and the reduced user dictionary transmitted from the client 10 (step S104). The speech recognition section 22 of the server side performs speech recognition processing on the received speech data using both the system dictionary in the system dictionary section 21 and the received reduced user dictionary (step S105: speech recognition step).

Then, when speech recognition information regarding the input speech applied with the speech recognition is sent back to the client 10, it is output to the outside from the client 10 (input speech output step). In that case, it is output and displayed by an image or a character display to the outside from the recognition result output section 15, for example.

Note that each of the steps 101 to 105 may be configured such that the execution content is divided into the client 10 side and the server side and is executable by a control program or a program for data processing, and may be executed by a computer previously provided to each side.

Next, the configuration of the reduced dictionary creation unit 13 will be described with reference to FIG. 3.

The reduced dictionary creation section 13 includes a comparing section 13A which compares the input speech and the words and calculates the likelihood that the words appear in the input speech, a word temporarily storing section 13B which temporarily stores sets of subject words and the likelihood, and a word selection section 13C which refers to the word temporarily storing section 13B and selects one or a plurality of words having high likelihoods.

Next, operation of the reduced dictionary creation section 13 will be described based on FIG. 4.

The reduced dictionary creation section 13 repeats the processing of step S202 and step S203 to the respective words included in the user dictionary 12 (step S201).

At step S202, the reduced dictionary creation section 13 calculates, in the comparing section 13A, the likelihood that a target word is included in the input speech (likelihood calculation step). At step S203, the reduced dictionary creation section 13 creates a reduced dictionary by associating (pairing) the target word and the calculated likelihood and stores in the created word temporarily storing section 13B (word temporarily storing step).

When the above processing has been finished to all of the words included in the user dictionary 12, the reduced dictionary creation section 13 activates the word selection section 13C. The reduced dictionary creation section 13 selects, by the word selection section 13C, words having high likelihoods among the words stored in the word temporarily storing section 13B (word selection step). The selected words are edited to be in a form of a dictionary, and a reduced user dictionary is created and stored in the reduced user dictionary section 13D (reduced dictionary creation step).

Note that the selection processing performed by the word selection section 13B can be executed in various ways. For example, the processing can be performed by previously setting a fixed likelihood and selecting words of this likelihood and higher while not selecting words of lower likelihoods.

Alternatively, the processing can be performed by previously setting a fixed number, and selecting words of higher likelihoods in order within a range of not exceeding this number.

Needless to say, these ways may be combined, for example, such as selecting words of higher likelihoods in order within a range that the number of selected words does not exceed the predetermined number, and at the same time, not selecting words of lower likelihoods than a predetermined lowest likelihood.

In practice, the user dictionary 12 can be configured as dictionary data stored in a hard disk or a nonvolatile memory, for example. The word temporarily storing section 13B is configured as a data storing region secured in a hard disk, a nonvolatile memory, or a volatile memory.

The comparing section 13A and the word selection section 13C may be configured by executing a computer program stored on a memory by the CPU.

Further, the reduced user dictionary section 13D is in a form of dictionary data stored in a hard disk or a memory, which is the same as the case of the user dictionary section 12.

In the reduced user dictionary stored in the reduced user dictionary section 13D, as the stored data is limited to the words selected by the word selection section 13C, it has a characteristic of a partial dictionary of the user dictionary.

The comparing section 13A can be in various embodiments. For example, a method used for word spotting in a field of the speech recognition may be directly applied and performed. Word spotting is a method of picking up necessary words and syllables from an input speech, which is described in "Report of Standard Technologies prepared by Japan Patent Office" of 2001, Theme "Search Engine, C-6-(3) "Speech Search", for example.

In the first exemplary embodiment, it is only necessary to determine, with respect to each of the words in the user dictionary 12, whether the word can be picked up from the input speech (extraction availability determination step), and store the word in the word temporarily storing section 13B together with the likelihood calculated at the time of determination (reduced dictionary creation step).

These steps may be configured such that the contents thereof are programmed and executed by a computer having been provided to the client side.

Referring to the "Report of Standard Technologies" mentioned above, one method of implementing word spotting uses DP (Dynamic Programming) matching. DP matching is a pattern matching technology for speech recognition, in which time normalization is performed such that the same phoneme in words correspond to each other to thereby calculate a resemble distance between words. Here, it is assumed that there are two speech waveforms with respect to one word, for example. These are assumed to be time-series patterns A and B, in which A is an input speech, and B is a standard pattern.

In the case of performing word spotting using DP matching, the standard pattern B of a spotting object word is shifted by one frame from the starting end of the input speech A (parameter series such as spectrum) to thereby perform DP matching with a partial segment of the input speech.

When a distance as a matching result becomes a threshold or lower, it is determined that there is a standard pattern at that point.

In the first exemplary embodiment, it is not required to set a threshold mentioned above. The first exemplary embodiment can be configured such that positive and negative of a distance value is inverted and output as a likelihood, regardless of the distance value. The reason why positive and negative is inverted when the distance is converted to a likelihood is that as the possibility of the word being included in the input speech is higher as the distance becomes shorter, the value is necessary to be inverted in order to be used as a likelihood in which the possibility of the word being included in the input speech becomes higher as the value is larger.

Further, a method of performing word spotting using HMM (Hidden Markov Model), instead of DP matching, is also well known. A method of performing word spotting using HMM is described in detail in "Speech Recognition Based on Probability Models", $2^{nd}$ edition, (by Sciichi NAKAGAWA, published by the Institute of Electronics, Information and Communication Engineers, 1989), Section 3, 3.4.2 "Phoneme/Syllable/Word Spotting Algorithm".

As described in detail above, the comparing processing performed by the comparing section 13A can be executed in various modes using well-known art.

Next, specific operation of the entire first exemplary embodiment will be described in detail using the examples of inputs in FIG. 5 and the flowcharts of FIGS. 2 and 4.

FIG. 5(a) shows an example of a user dictionary (contents) stored in the user dictionary section 12. This user dictionary mainly stores Japanese writings and pronunciations of place names in New York City.

Now, it is assumed that a user speaks (inputs speech) "sheisutajiamuwadokodesuka" to the speech input section 11 of the client 10 (step S101 in FIG. 2).

The reading corresponding to this phonation, when written in hiragana, is "sheisutajiamuwadokodesuka". When the speech is input by the user, the reduced dictionary creation section 13 is immediately activated (step S102 in FIG. 2).

Referring to FIG. 4, the reduced dictionary creation section 13 repeatedly performs processing of calculating, regarding each of the words stored in the user dictionary 102, the likelihood that the word is included in the input speech, and stores in the word temporarily storing section 13B (step S201: step S202 to step S203 in FIG. 4). In this example, first, a word "iisutobirejji" is selected as a word to be calculated for likelihood. The reduced dictionary creation section 13 compares the word and the input speech, and calculates the likelihood that this word is included in the input speech. If the calculated likelihood is "0.2" for example, the reduced dictionary creation section 13 stores the dictionary content of the word "iisutobirejji", that is, a set of writing/pronunciation and the likelihood "0.2", in the word temporarily storing section 13A.

Next, the target word is changed to the next word "kuroisutazu" in the user dictionary, and likelihood calculation is performed in the same manner. If the calculated likelihood is "0.1" for example, the reduced dictionary creation section 13 stores the dictionary content of the word "kuroisutazu", that is, a set of writing/pronunciation and the likelihood "0.1", in the word temporarily storing section 13B. The reduced dictionary creation section 13 repeatedly performs processing of this likelihood calculation and word storage to the word temporarily storing section 13B, on all words in the user dictionary 12.

FIG. 5(b) shows an example of the contents of the word temporarily storing section 13B at the time when the processing of likelihood calculation and word storage has been completed. In the word temporarily storing section 13B, the calculated likelihood is stored while being associated with each of all words included in the user dictionary.

Next, the reduced dictionary creation section 13 selects, by the word selection section 13C, words having high likelihoods from the word temporarily storing section 13B (step S204 in FIG. 4). In this example, it is assumed that the word selection section 13C is configured to select words having the likelihood of "0.5" or higher, for example. Referring to the contents of FIG. 5(b), the corresponding words are "sheisutajiamu" (likelihood 0.8), "sheekusupiagaaden" (likelihood 0.6), and "meishiizu" (likelihood 0.5), so that these three words are selected by the word selection section 13C.

Next, the reduced dictionary creation section 13 outputs the three words selected by the word selection section 13C, and creates a dictionary consisting of these three words (step S205 in FIG. 4). The dictionary created in this manner is a reduced user dictionary, and is stored in the reduced user dictionary section 13D. FIG. 5(c) shows the stored contents.

In FIG. 5(c), the reduced user dictionary consists of the three selected words "sheisutajiamu, sheekusupiagaaden, meishiizu", and the dictionary content of each word is configured as to be completely the same as that of the user dictionary shown in FIG. 5(a).

In this way, the reduced user dictionary created by the client 10 is transmitted from the client communication section 14 over the communication network 120 to the server communication section 23 of the server 20, together with the input speech data "sheisutajiamuwadokodesuka" (step S103 in FIG. 2).

When the server 20 receives the input speech data and the reduced user dictionary from the server communication section 23, the server 20 performs speech recognition processing by the speech recognition section 22 (step S105 in FIG. 2). In this speech recognition processing, both the reduced user dictionary transmitted from the client 10 and the system dictionary in the server 20 side are used. FIG. 5(d) shows exemplary contents of the system dictionary stored in the system dictionary section 21 of the server 20.

Referring to FIG. 5(d), in this example, the system dictionary section 21 stores general words having high possibility of being used in any situations including demonstratives such as "koko" and "soko", independent auxiliary verbs such as "da" and "desu", case particles such as "ga", "wo", and "ni", an adverbial particle "wa", a final particle "ka", common nouns "nippon" and "washinton", and interjection "hai" and "iie".

The speech recognition section 22 performs speech recognition processing on the input speech "sheisutajiamuwadokodesuka" using both the reduced user dictionary and the system dictionary, and acquires a speech recognition result "sheisutajiamu/wa/doko/desu/ka". Here, the slash "/" is a sign inserted for explanatory purpose in order to indicate separations in the recognized words.

In the speech recognition result "sheisutajiamu/wa/doko/desu/ka", the leading word "sheisutajiamu" is a word derived from the reduced user dictionary, and the all of the following words "wa" "doko" "desu" "ka" are derived from the system dictionary. The words in the reduced user dictionary are originally stored in the user dictionary 12 of the client 10.

As described above, in the first exemplary embodiment, even in the case where words in the user dictionary of the user dictionary section 12 of the client 10 side and words in the system dictionary of the system dictionary section 21 of the server 20 side are combined, the speech recognition result can be acquired. This is an advantage of the present invention over the conventional art.

Here, a general-purpose technique, in which the entire user dictionary of the client is transferred to the server prior to the speech recognition and is used together with the system dictionary in the speech recognition processing, and the first exemplary embodiment of the invention will be compared.

In the general-purpose technique, the entire user dictionary, that is, all ten words in the example of FIG. 5(a) have to be transmitted. On the other hand, in the first exemplary embodiment of the invention, it is only necessary to transmit data of three words stored in the reduced user dictionary, as described above.

In general, the communication network 120 connecting the client 10 and the server 20 usually has slower data transfer speed and takes significantly higher cost for data transfer, compared with those of a data bus built in each of the client 10 and the server 20. In this situation, it is very important to reduce the amount of data to be transferred, whereby it is possible to achieve an advantage of reducing the time and cost for transfer which has not been achieved conventionally.

Further, even in the case where calculation resources usable in the client 10 are few and accuracy of likelihood calculation by the comparing section 13A of the reduced dictionary creation section 13 is not high, the selection criteria in the word selection section 13C is set to be less strict such that a larger number of words can be selected.

With this configuration, the first exemplary embodiment of the invention can prevent deterioration in the accuracy of speech recognition, which is a unique advantage (positive effect) of the first exemplary embodiment.

This is because even if the selection section 13C selects words which are finally unnecessary so that unnecessary words are included in the reduced user dictionary, it is expected that a correct result can be achieved in the speech recognition processing performed by the server 10 unless the words included in the correct result are not missed. In such a case, although the size of the reduced user dictionary becomes large and the data transfer time and the cost are affected, the selection criteria of the selection section 13C may be set while considering trade-off with those effects.

The first exemplary embodiment is characterized in that only input speech is required in creating the reduced user dictionary.

On the other hand, in the general-purpose technique, it has been necessary to narrow down the vocabulary to be transmitted from the client to the server by using information other than speech such as ID of a form of an input destination.

In the first exemplary embodiment, no information other than input speech is necessary when creating the reduced user dictionary, as described above. As the input speech is information which is to be required inevitably in speech recognition processing, the first exemplary embodiment is applicable to any situation of performing speech recognition processing.

This aspect is a significant advantage of the present exemplary embodiment, compared with the general-purpose technique which is not applicable when there is no information other than speech data to be processed in speech recognition.

Note that in the exemplary embodiment, it is easy to determine the selection criteria of the word selection section 13C while considering the communication speed and communication cost of the communication network 120. For example, if the communication speed is low or the communication cost is high, it is easily adjustable to suppress the maximum number of words to be stored in the reduced user dictionary so as not to take time and cost exceeding a certain limit for transferring the reduced user dictionary from the client 10 to the server 120. It is also easy to have a configuration in which such an adjustment is dynamically performed each time speech is input.

As described above, the first exemplary embodiment has the following advantages.

That is, in the speech recognition processing performed by the server 20, a speech recognition result can be obtained using substantially both the system dictionary and the user dictionary at the same time. Specifically, as a user dictionary is installed in a client such as a mobile terminal held by a user, the user registers necessary words in the user dictionary. Although it is the best way to transmit the user dictionary to the server with the original capacity and perform speech recognition using the user dictionary and the system dictionary, a problem will be caused in the aspect of transmission capacity when considering transmission of the dictionary.

As such, in the exemplary embodiment, words determined as unnecessary for recognizing an input speech are eliminated to thereby create a reduced user dictionary by reducing the capacity of the user dictionary, which is transmitted to the server together with the data of the input speech. As such, it is possible to prevent the transmission capacity from the client to the server from being increased. Further, as the reduced user dictionary transmitted to the server includes the words necessary for recognizing the input speech and the words are registered by the user, the input speech can be recognized reliably by combining the reduced user dictionary and the system dictionary of the server.

As described above, in the exemplary embodiment, as the reduced user dictionary is created from the user dictionary, the reduced user dictionary is created by eliminating words determined as unnecessary for recognizing the input speech, and recognition processing of the input speech using the reduced user dictionary and the system dictionary is substantially the same as recognition processing of the input speech using the user dictionary and the system dictionary. As such, the speech recognition result can be obtained using substantially both the system dictionary and the user dictionary at the same time, as described above.

Further, even in the case where information other than input speech cannot be used, the reduced user dictionary can be easily created only with the input speech, and as the amount of transfer becomes significantly small compared with the case of transferring the user dictionary in the example of the general-purpose technique, the amount of data to be transferred between the client and the server can be reduced in a large amount. Further, even if resources usable in the client are small, there is an advantage that an adverse effect on the accuracy of the speech recognition is small in the entire system.

As the first exemplary embodiment of the invention is configured and works as described above, when speech recognition processing is performed by the speech recognition device as described above, the input speech and the reduced user dictionary are transmitted from the speech input device. As such, on the speech recognition device side, speech recognition can be performed on the input speech while maintaining the quality of the speech recognition based on the reduced user dictionary and the system dictionary. Further, as the reduced user dictionary having a smaller capacity is transmitted, instead of the user dictionary, from the speech input device, the amount of data to be transmitted to the speech recognition device and the communication cost can be reduced significantly compared with the case of transmitting the entire user dictionary. As such, the data transmission time and the time for processing speech recognition in the speech recognition device can be reduced significantly, whereby the speech recognition can be performed rapidly without increasing the burden on the system while maintaining, the quality of speech recognition.

Second Exemplary Embodiment

Next, a second exemplary embodiment of the invention will be described with reference to FIGS. 6 and 7.

The same components as those of the first exemplary embodiment are denoted by the same reference numerals.

In FIGS. 6 and 7, a speech recognition system of the second exemplary embodiment is configured of a client terminal device (hereinafter referred to as "client") 60 working as a speech input device and a server 70 working as a speech recognition device.

The client (client terminal device) 60 includes a speech input section 61, a data processing section 62, a storage section 63, a client communication section 64, a reduced dictionary creation program 65, and a recognition result output section 69, as shown in FIG. 6.

The storage section 63 stores a user dictionary 63*a* as data. The data processing section 62 reads the reduced dictionary creation program 65 and controls data processing (creation of reduced dictionary).

The data processing section 62 performs the same processing as that performed by the reduced dictionary creation section 13 of the first exemplary embodiment, in accordance with the reduced dictionary creation program 65. Specifically, the data processing section 62 refers to the speech input to the speech input section 61 of the client (client terminal device) 60, and creates a reduced user dictionary by selecting some words having high possibility of being included in the speech, from the user dictionary 63*a* in the storage section 63. The reduced user dictionary created by the client 60 is transmitted by the client communication section 64 to the server (speech recognition device) 70 over the communication network 120. A reference numeral 69 indicates a recognition result output section which outputs and displays a recognition result with respect to the input speech transmitted from the server 70.

Further, the server 70 working as a speech recognition device includes a server communication section 71, a data processing section 72, a storage section 73, and a speech recognition program 75, as shown in FIG. 7. The storage section 73 stores a system dictionary 73*a* as data. The data processing section 72 reads the speech recognition program 75 and controls data processing.

The data processing section 72 performs the same processing as that performed by the speech recognition section 22 of the first exemplary embodiment, in accordance with the speech recognition program 75.

Specifically, the data processing section 72 first receives the input speech data and the reduced user dictionary transmitted from the client 60 via the server communication section 71, and then performs speech recognition processing on the input speech data using both the system dictionary 73*a* in the storage section 73 and the reduced user dictionary.

In the second exemplary embodiment, the client 60 and the server 70 can be realized with any electronic devices having CPU and memories and capable of being connected over networks, such as personal computers (PC), PDA (Personal Digital Assistant), and mobile telephones. Further, if a computer has a general-purpose speech input function, it can be directly used as the input section 61 of the client 60.

The functions of the other sections or other configurations and their operational effects are the same as those of the first exemplary embodiment.

As described above, the second exemplary embodiment has the following advantages.

First, in the speech recognition processing performed by the server 70, a speech recognition result which is the same as the case of substantially using the system dictionary and the user dictionary can be obtained, which is the same as the first exemplary embodiment. This provides an advantage that the amount of data to be transferred between the client 60 and the server 70 is small, even when information other than the input speech cannot be used.

Further, even in the case where resources usable in the client 60 are few, there is an advantage that an adverse effect to the accuracy of the speech recognition is small in the entire system.

As described above, in the respective exemplary embodiments, the client terminal device (client) which is a speech input device extracts words from the user dictionary with reference to the input speech and creates the reduced user dictionary. Extraction of words is performed as processing of determining possibilities that the words in the user dictionary are included in the input speech, and extracting those of high possibilities. Then, the input speech and the reduced user dictionary are transmitted from the speech input device (client) to the speech recognition device (server). On the other hand, on the speech recognition device (server) side, speech recognition processing is performed using the system dictionary and the reduced user dictionary at the same time. As the differences between the user dictionary of the client and the reduced user dictionary are only words having low possibilities of being included in the input speech, in the speech recognition processing by the server, the same speech recognition result as that of the case of using the system dictionary and the user dictionary at the same time is obtained substantially.

Further, as it is expected that the size of the reduced user dictionary is significantly smaller than the size of the user dictionary, the amount of data to be transferred between the speech input device and the speech recognition device can be reduced reliably than the case of transmitting the entire user dictionary. Further, regarding communications between the speech input device and the speech recognition device, the transfer speed is lower and the communication cost is higher usually, compared with data transfer inside a server or a client. As such, reduction of the amount of transferred data provides reduction of the data transfer time, improvements in responses of speech recognition processing, and reduction of the communication costs.

Further, when the speech input device (client) determines whether the words in the user dictionary have possibilities of being included in the input speech, it is only necessary to be careful not to miss the words actually included therein at this stage, and even if unnecessary words are included in the reduced user dictionary, it does not affect the accuracy of the final speech recognition, because it is expected that unnecessary words are not finally adopted in the speech recognition processing. As such, even in the case where resources usable in the speech input device (client) are few so that processing cannot be performed with high accuracy, the accuracy of the speech recognition will not be adversely affected directly. In other words, it is easy to install the functions of the present invention to a speech input device (client) having few resources such as a CPU or a memory.

As such, according to the exemplary embodiments of the invention, in addition to the fact that speech recognition processing by the speech recognition device can obtain a speech recognition result which is substantially the same as the case of using both the system dictionary and the user dictionary, even in the case where information other than the input speech cannot be used, the amount of data to be transferred between the speech input device and the speech recognition device is few. Further, even in the case where resources usable in the speech input device are few, an adverse effect on the accuracy of speech recognition can be small in the entire system.

A speech recognition system according to another exemplary embodiment of the invention is a speech recognition system in which a speech input device, which converts speech into electric signals and input the signals as input speech, and a speech recognition device, which takes in the input speech and processes to recognize the input speech, are connected in a communicable manner. The speech recognition system may be configured such that the speech input device includes a user dictionary section which stores words to be used for recognizing the input speech, and a reduced user dictionary creation unit which extracts words corresponding to the input speech from the user dictionary section and creates a reduced user dictionary, and that the speech recognition device includes a speech recognition unit which receives the input speech and the reduced user dictionary from the speech input/output device and recognizes the input speech based on the reduced user dictionary and a system dictionary, provided beforehand, storing words for speech recognition.

With this configuration, in speech recognition processing to be performed by the speech recognition device, the input speech and the reduced user dictionary are transmitted from the speech input device. As such, the speech recognition device is capable of performing speech recognition on the input speech while maintaining the quality of speech recognition based on the reduced user dictionary and the system dictionary. Further, as the reduced user dictionary having smaller data capacity is transmitted from the speech input device instead of the user dictionary, the amount of data to be transferred to the speech recognition device and the communication costs can be reduced significantly, compared with the case of transmitting the entire user dictionary. In this aspect, the time for data transmission and processing time for speech recognition in the speech recognition device can be reduced significantly.

A speech recognition system according to another exemplary embodiment of the invention is a speech recognition system in which a speech input device, which converts speech into electric signals and inputs the signals as input speech, and a speech recognition device, which processes to recognize the input speech, are connected in a communicable manner. The speech input/output device includes a speech input section which inputs speech, a user dictionary section which stores words to be used for recognizing the input speech, a reduced user dictionary creation section which extracts words corresponding to the input speech from the user dictionary and creates a reduced user dictionary, and a transmission unit which transmits the input speech and the reduced user dictionary to the speech recognition device. Further, the speech recognition device may be configured as to include a system dictionary section which stores words for speech recognition, a reception unit which receives the input speech and the reduced user dictionary transmitted from the speech input device, and a speech recognition section which performs speech recognition processing on the input speech using the system dictionary and the reduced user dictionary.

In this speech recognition system, as speech recognition processing by the speech recognition device can be performed based on the reduced user dictionary and the system dictionary, a speech recognition result which is the same as the case of using both the user dictionary and the system dictionary can be obtained substantially.

Further, the amount of data to be transferred from the speech input device to the speech recognition device and the communication costs can be reduced significantly, compared with the case of transmitting the entire user dictionary. In this aspect, there is an advantage that the load on the network can be reduced reliably, and the processing time for speech recognition can be reduced as a whole. Further, the amount of data to be transferred from the speech input device to the speech recognition device and the communication costs can be reduced significantly, compared with the case of transmitting the entire user dictionary.

Note that the reduced user dictionary described above is a dictionary in which words having possibilities of being included in the input speech are selected from the words in the user dictionary. Further, the reduced user dictionary creation unit may be configured to compare the words in the user dictionary and the input speech, calculate the likelihood that the words appear in the input speech, and based on the calculation result, select the words of high likelihoods and create the reduced user dictionary.

Thereby, as the differences between the user dictionary and the reduced user dictionary are words having low possibilities of being included in the input speech, a speech recognition result which is the same as the case of using both the system dictionary and the user dictionary can be obtained substantially in the speech recognition processing. Further, as the processing performed in the speech input device side is to determine whether the words in the user dictionary have possibilities of being included in the input speech, it is only necessary to be careful of not missing words actually included in the input speech in this stage. As such, there is an advantage of not adversely affecting the accuracy of the speech recognition directly as the general-purpose technique.

Further, the reduced user dictionary creation unit may be configured to create the reduced user dictionary by the word spotting method using the user dictionary.

Thereby, it is possible to apply the word spotting method used for speech recognition to the creation of the reduced user dictionary to thereby create an effective reduced user dictionary.

Further, the reduced user dictionary creation unit may includes a comparing section which compares the input speech and the words in the user dictionary and counts the likelihood of the respective words included in the input speech, a word temporarily storing section which temporarily stores sets of the respective counted words and the corresponding likelihood, and a word selection section which selects one or a plurality of words of high usage from the word temporarily storing section and create a reduced user dictionary.

A speech recognition method according to another exemplary embodiment of the invention may include converting speech into electric signals and input the signals as input speech by a speech input device, extracting words relating to the input speech from a user dictionary for speech recognition provided to the speech input device and creating a reduced user dictionary, transmitting the input speech and the reduced user dictionary from the speech input device to a speech recognition device, and performing speech recognition processing on the input speech, operated in the speech recognition device receiving the input speech and the reduced user dictionary, based on a system dictionary for speech recognition provided to the speech recognition device and the reduced user dictionary.

A speech recognition method according to another exemplary embodiment of the invention may include converting speech into electric signals and inputting the signals as input speech by a speech input device, extracting words relating to the input speech from a user dictionary for speech recognition provided to the speech input device and creating a reduced user dictionary, transmitting the input speech and the reduced user dictionary from the speech input device to a speech recognition device, receiving by the speech recognition device which received the input speech and the reduced user dictionary, and operating the speech recognition device to perform speech recognition processing on the input speech based on a system dictionary for speech recognition provided to the speech recognition device and the reduced user dictionary.

As such, in the speech recognition processing performed in the speech recognition device, a speech recognition result which is the same as the case of using both the system dictionary and the user dictionary can be obtained substantially. Further, the amount of data to be transferred from the speech input device to the speech recognition device and the communication costs can be reduced, compared with the case of transmitting the entire user dictionary.

Note that when creating the reduced user dictionary, it is acceptable to compare the words in the user dictionary and the input speech, calculate the likelihood that the words appear in the input speech, select the words of high likelihoods based on the calculation result, and create the reduced user dictionary.

Further, when creating the reduced user dictionary, it is acceptable to create the reduced user dictionary from the user dictionary by the word spotting.

Further, when creating the reduced user dictionary, it is acceptable to compare the input speech and the words in the user dictionary, count the likelihood of the respective words appearing in the input speech, temporarily hold sets of the respective counted words and the corresponding likelihood, select one or a plurality of words of high likelihoods from the temporarily stored words and create a reduced user dictionary, and edit the selected words to be in a form of a dictionary to thereby create a reduced user dictionary.

A speech recognition program according to another exemplary embodiment of the invention may, in a speech recognition system in which a speech input device which converts speech into electric signals and input the signals as input speech and a speech recognition device which takes in the input speech input to the speech input device and applies recognition processing are connected in a communicable manner, cause a computer to perform a speech input controlling function to convert the speech received by the speech input device into electric signals and input the signals as input speech, a reduced user dictionary creation controlling function to extract words relating to the input speech from a user dictionary for speech recognition provided to the speech input device and create a reduced user dictionary, and a transmission controlling function to transmit the input speech and the reduced user dictionary from the speech input device to the speech recognition device for speech recognition processing.

A speech recognition processing program according to another exemplary embodiment of the invention may, in a speech recognition system in which a speech input device which converts speech into electric signals and input the signals as input speech and displays the recognition result and a speech recognition device which takes in the input speech input to the speech input device and applies recognition processing and sends back the speech to the speech input device are connected in a communicable manner, cause a computer which is provided to the speech recognition device to execute a recognition object reception processing function to receive the input speech transmitted from the speech input device and a reduced user dictionary according to a user dictionary of the speech input device side, and a speech recognition processing function to perform speech recognition processing on the received input speech based on the system dictionary for speech recognition provided to the speech recognition device and the received reduced user dictionary.

Even with this configuration, as speech recognition processing can be performed rapidly as the case of the respective systems, and even by using a reduced user dictionary, it is possible to obtain a speech recognition result which is substantially the same as the case of using the user dictionary, and there is an advantage that the amount of data to be transmitted from the speech input device to the speech recognition device and the communication costs can be reduced significantly compared with the case of transmitting the entire user dictionary, and the entire processing time for speech recognition can be reduced.

Note that a configuration to cause a computer to perform a function of creating the reduced user dictionary by comparing the words in the user dictionary and the input speech, calculating the likelihoods that the words appear in the input speech, and selecting the words of high likelihoods based on the calculation result is also acceptable.

Further, a configuration to cause a computer to perform a function of creating the reduced user dictionary by comparing the input speech and the words in the user dictionary, counting the likelihood of the respective words appearing in the input speech, temporarily holding sets of the respective counted words and the corresponding likelihoods, and selecting one or a plurality of words of high likelihoods from the temporarily stored words is also acceptable.

Further, a configuration of creating the reduced user dictionary from the user dictionary by the word spotting is also acceptable.

Thereby, in the speech recognition processing performed by the speech recognition device, it is possible to substantially obtain a speech recognition result which is the same as the case of using both the system dictionary and the user dictionary. Further, as processing by the speech input device is processing for determining whether the words in the user dictionary have possibilities of being included in the input speech, it is only necessary to be careful of not missing words actually appearing therein in this stage, so that the accuracy of the speech recognition is not adversely affected directly.

While the present invention has been described with reference to the embodiments (and examples), the present invention is not limited to these embodiments (and examples). Various changes in form and details which can be understood by those skilled in the art may be made within the scope of the present invention.

This application is the National Phase of PCT/JP2008/054705, filed Mar. 14, 2008, which is based upon and claims the benefit of priority from Japanese patent application No. 2007-065229, filed on Mar. 14, 2007, the disclosure of which is incorporated herein in its entirety by reference.

INDUSTRIAL APPLICABILITY

In the above-described embodiments of the present invention, the present invention is applicable to a speech recognition system having a configuration in which speech is input to a client and speech recognition is performed in a server connected to the client over a communication network. Further, as a client, a wide variety of terminal devices can be used regardless of their size and mode, including PCs or car navigation terminals connected over networks, let alone mobile terminals such as PDA and motile telephones.

BRIEF DESCRIPTION OF THE DRAWINGS

FIG. 4 is a flowchart showing the operation of the reduced dictionary creation section disclosed in FIG. 3.

FIG. 5 is a table showing examples of a user dictionary of the client disclosed in FIG. 1 and a system dictionary of a server.

DESCRIPTION OF REFERENCE NUMERALS

Figure 1:
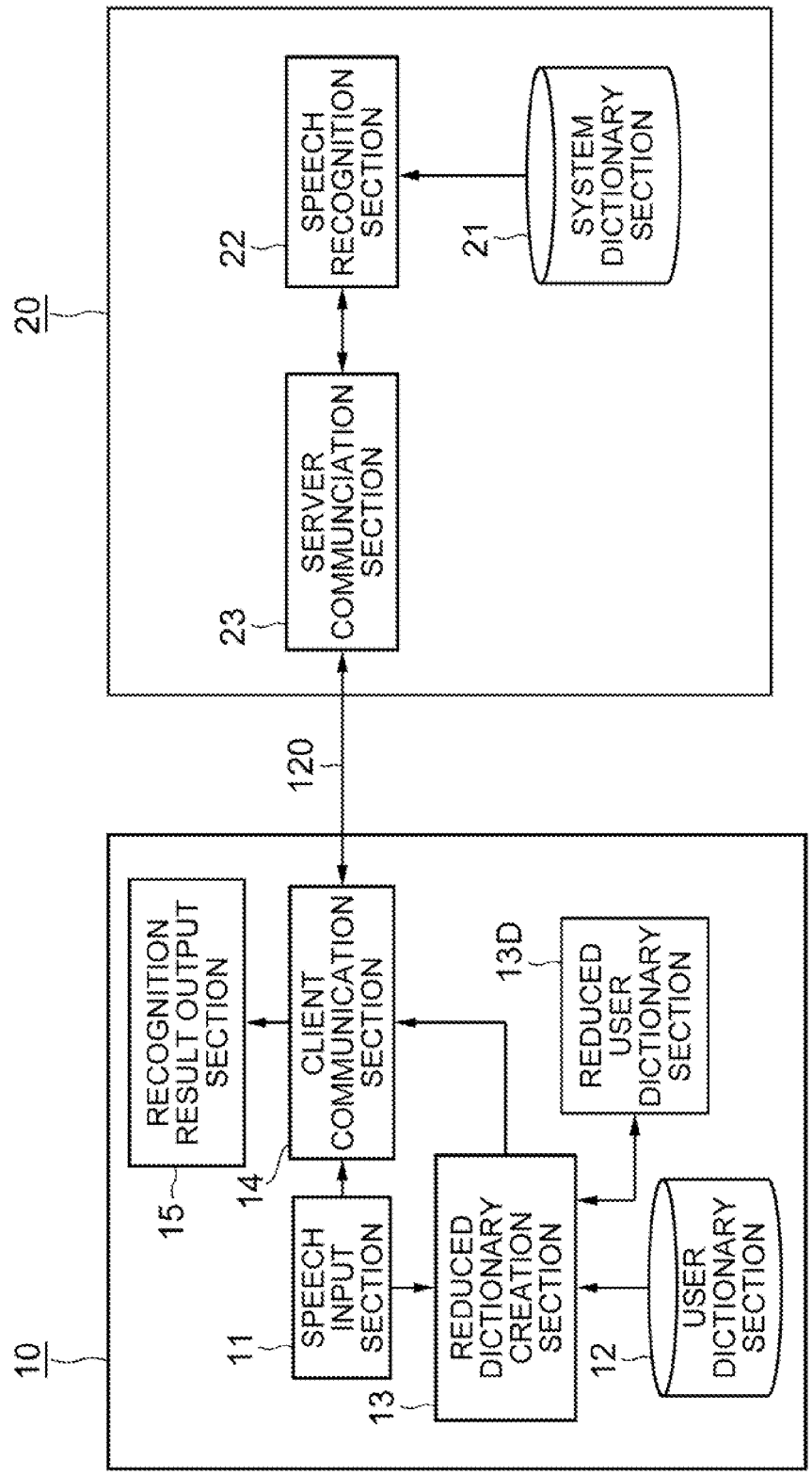
FIG. 1 is a block diagram showing the configuration of a speech recognition system according to a first exemplary embodiment of the invention.
Figure 2:
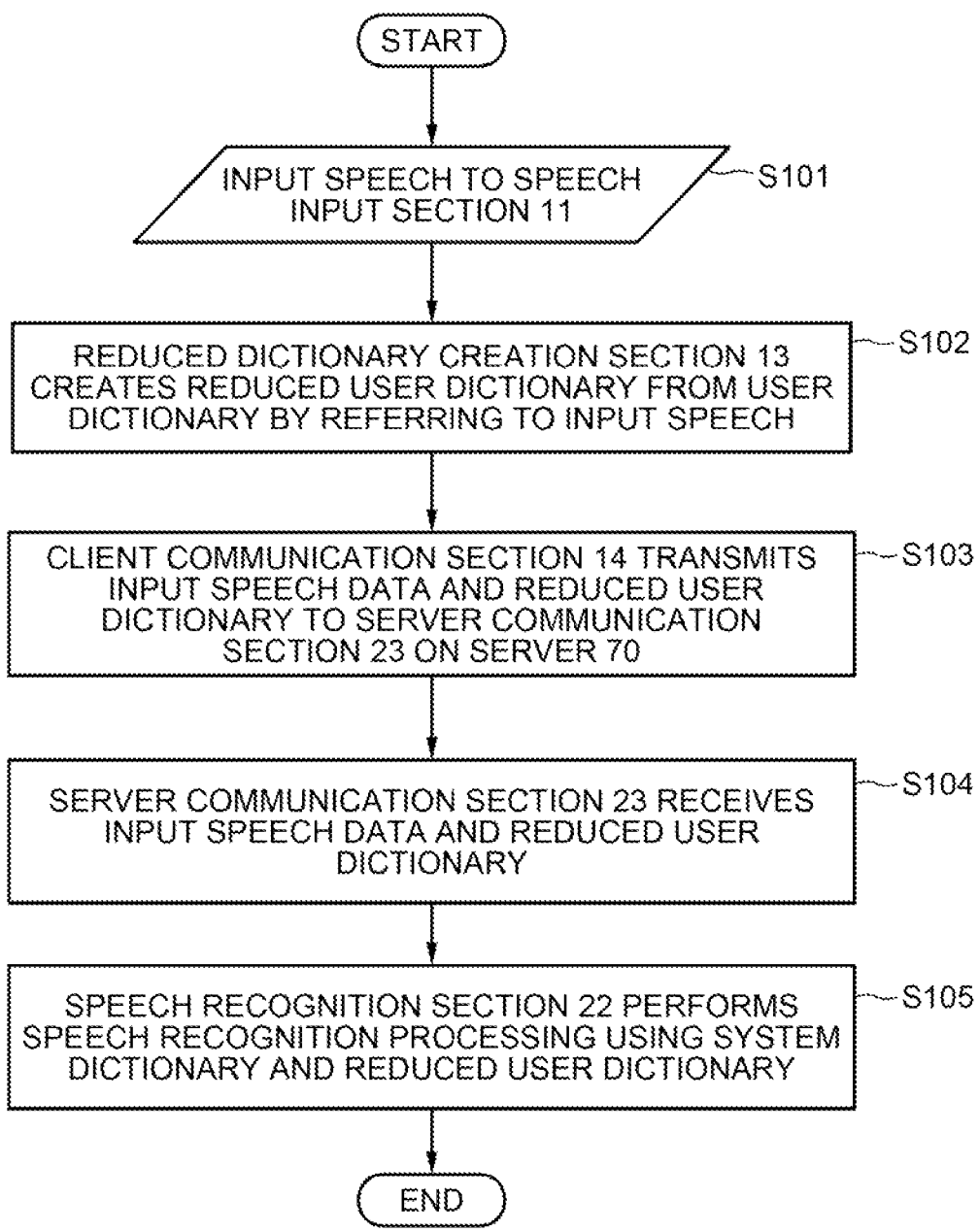
FIG. 2 is a flowchart showing the operation of the speech recognition system disclosed in FIG. 1.
Figure 3:
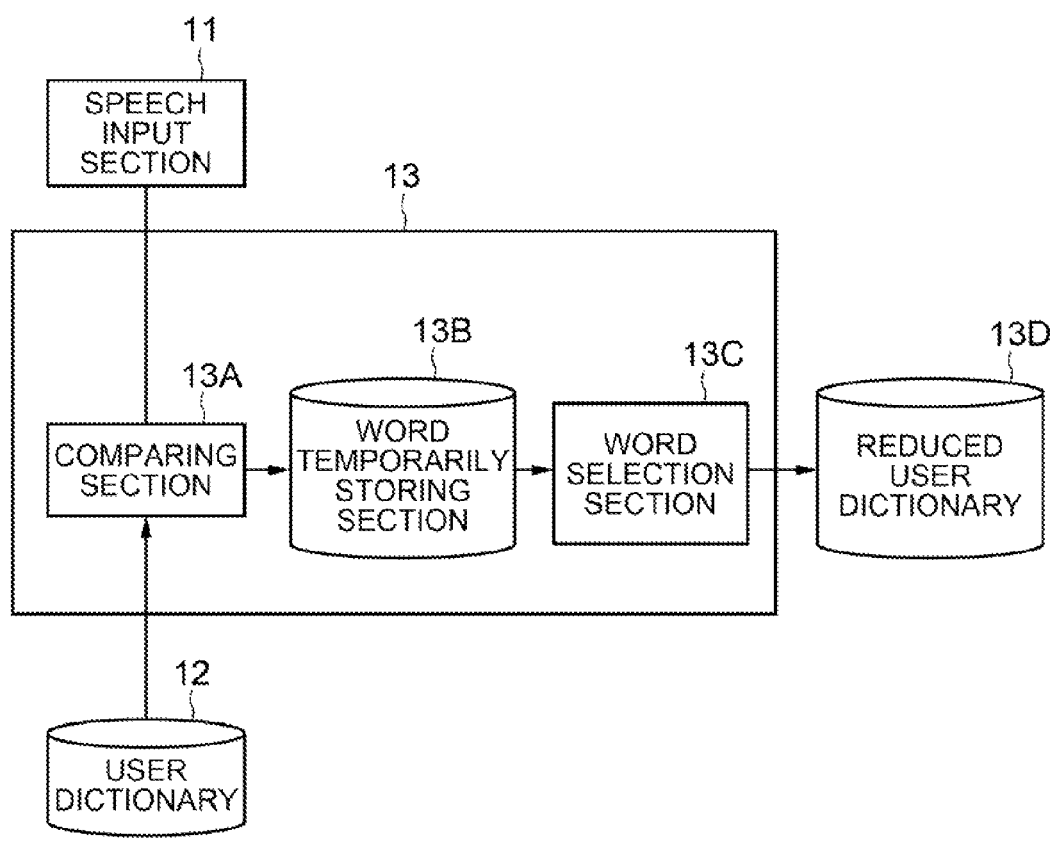
FIG. 3 is a block diagram showing the configuration of a reduced dictionary creation section of the speech recognition system disclosed in FIG. 1
Figure 6:
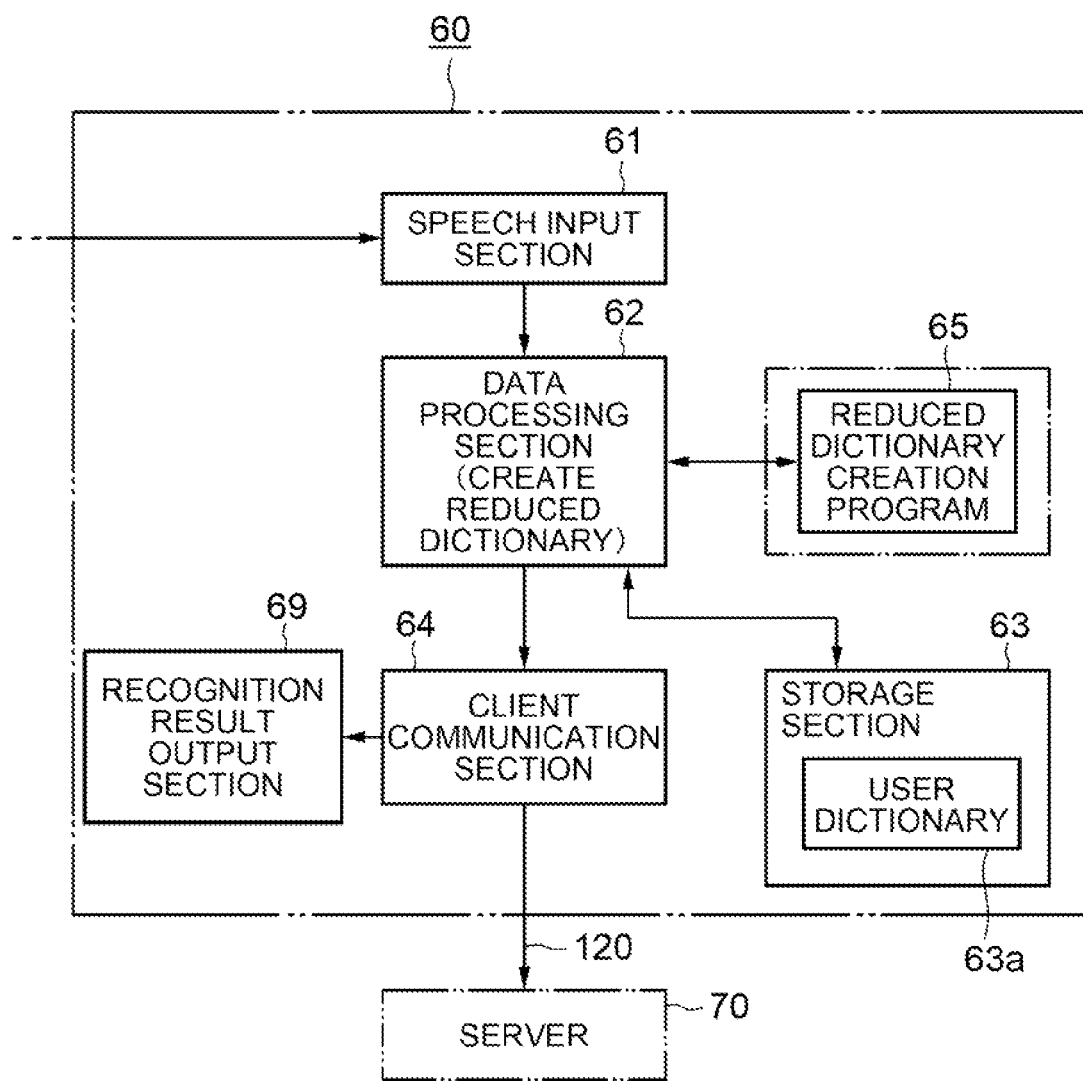
FIG. 6 is a block diagram showing the configuration of a client of a speech recognition system according to a second exemplary embodiment of the invention.
Figure 7:
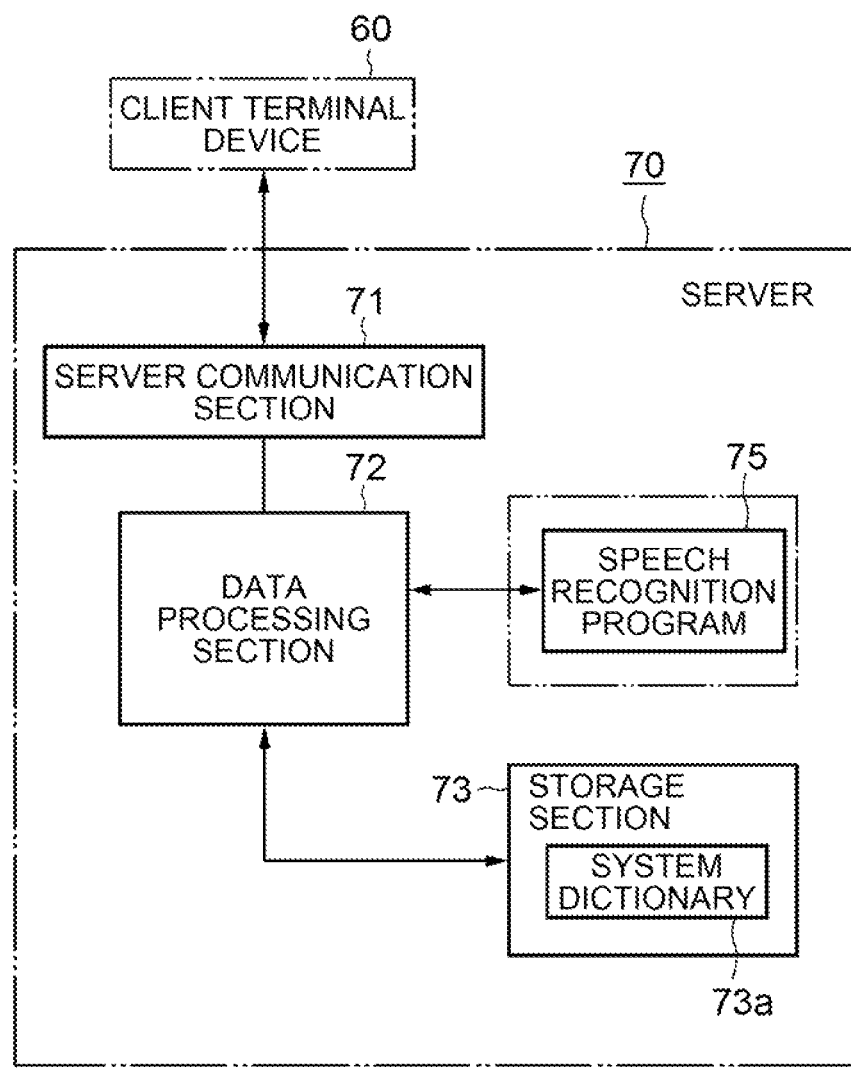
FIG. 7 is a block diagram showing the configuration of a server part of the speech recognition system disclosed in FIG. 6.
Figure 8:
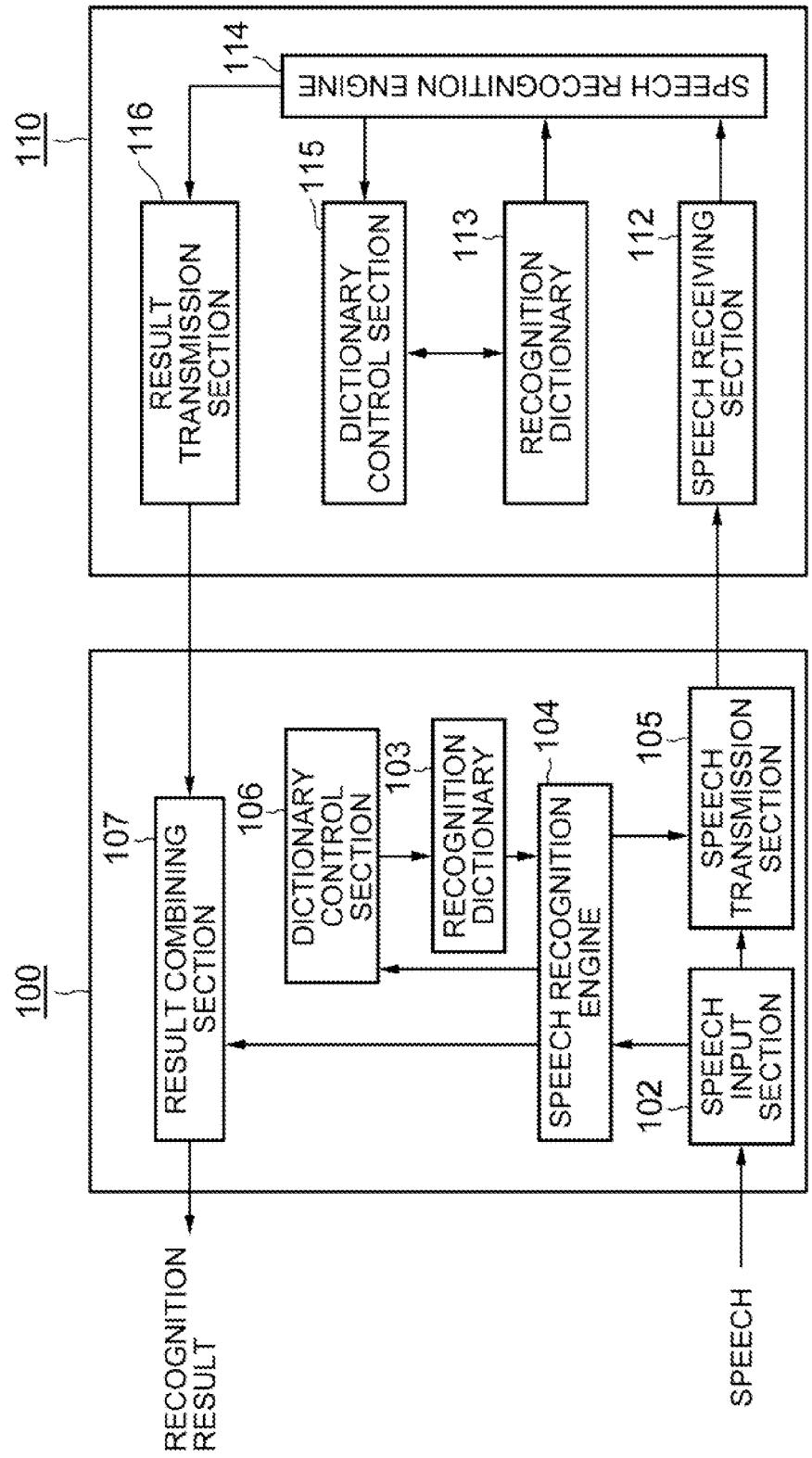
FIG. 8 is a block diagram showing the configuration of a general-purpose speech recognition system.
Figure 9:
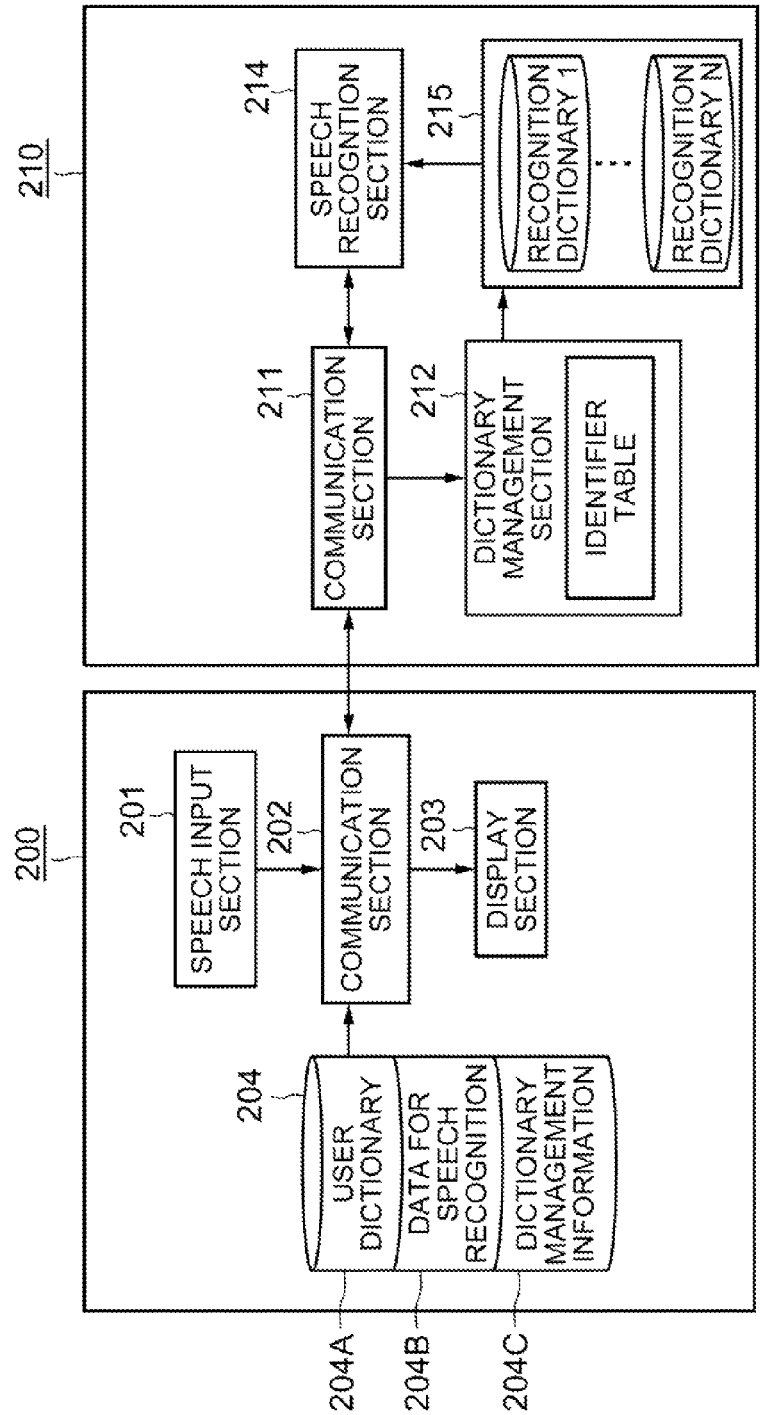
FIG. 9 is a block diagram showing the configuration of another general-purpose speech recognition system.

10, 60 client (client terminal device) as speech input device
11, 61 speech input section
12 user dictionary section
13 reduced dictionary creation section (reduced dictionary creation unit)
13A comparing section
13B word temporarily storing section
13C word selection section
13D reduced user dictionary section
14 client communication section (transmission unit, reception unit)
15, 69 recognition result output section
20, 70 server as speech recognition device
21 system dictionary
22 speech recognition section (speech recognition unit)
23 server communication section (transmission unit, reception unit)
62 data processing section (creation of reduced user dictionary)
72 data processing section (speech recognition processing)
73 storage section (storage section of user dictionary)
73*a* system dictionary
75 speech recognition program
120 communication network

What is claimed is:

1. A speech recognition system, comprising:
    a speech input device configured to input a speech as an input speech by converting the speech to an electric signal; and
    a speech recognition device configured to take in and recognize the speech input to the speech input device,
    wherein the speech input device and the speech recognition device are communicatively connected to each other,
    wherein the speech input device comprises:

a user dictionary section storing words for use with recognition of the input speech; and a reduced user dictionary creation unit configured to create a reduced user dictionary by extracting words corresponding to the input speech from the user dictionary section, and wherein the speech recognition device comprises:

a speech recognition unit configured to input the input speech and the reduced user dictionary from the speech input device and recognize the input speech based on the reduced user dictionary and a built-in system dictionary storing words for speech recognition, wherein the reduced user dictionary creation unit includes:

a comparing section which compares the input speech and a word in the user dictionary and compiles a likelihood of each word appearing in the input speech, a word temporarily storing section which temporarily stores a set of each word and a corresponding likelihood compiled, and a word selection section which selects one or a plurality of words having high usage from the word temporarily storing section to thereby create the reduced user dictionary.

2. The speech recognition system as claimed in claim 1, wherein the reduced user dictionary is a dictionary in which a word having a possibility of being included in the input speech is selected from the words in the user dictionary.

3. The speech recognition system as claimed in claim 2, wherein the reduced user dictionary creation unit compares a word in the user dictionary and the input speech, calculates a likelihood that the word appears in the input speech, and based on a calculation result, selects a word having a high likelihood to thereby create the reduced user dictionary.

4. The speech recognition system as claimed in claim 2, wherein the reduced user dictionary creation unit creates the reduced user dictionary by means of a word spotting method using the user dictionary.

5. The speech recognition system as claimed in claim 1, wherein the reduced user dictionary creation unit compares a word in the user dictionary and the input speech, calculates a likelihood that the word appears in the input speech, and based on a calculation result, selects a word having a high likelihood to thereby create the reduced user dictionary.

6. The speech recognition system as claimed in claim 1, wherein the reduced user dictionary creation unit creates the reduced user dictionary by means of a word spotting method using the user dictionary.

7. A speech recognition system, comprising:

a speech input device configured to input a speech as an input speech by converting the speech to an electric signal; and a speech recognition device configured to take in and recognize the input speech input to the speech input device, wherein the speech input device and the speech recognition device are communicatively connected to each other, wherein the speech input device comprises:

a speech input section for inputting a speech;

a user dictionary section storing words for use with recognition of the input speech;

a reduced user dictionary creation unit configured to create a reduced user dictionary by extracting words corresponding to the input speech from the user dictionary; and a transmission unit configured to transmit the input speech and the reduced user dictionary to the speech recognition device, and wherein the speech recognition device comprises:

a system dictionary section storing words for speech recognition;

a receiving unit configured to receive the input speech and the reduced user dictionary transmitted from the speech input device; and a speech recognition unit configured to perform speech recognition on the input speech by using the system dictionary and the reduced user dictionary, wherein the reduced user dictionary creation unit includes:

a comparing section which compares the input speech and a word in the user dictionary and compiles a likelihood of each word appearing in the input speech, a word temporarily storing section which temporarily stores a set of each word and a corresponding likelihood compiled, and a word selection section which selects one or a plurality of words having high usage from the word temporarily storing section to thereby create the reduced user dictionary.

8. The speech recognition system as claimed in claim 7, wherein the reduced user dictionary is a dictionary in which a word having a possibility of being included in the input speech is selected from the words in the user dictionary.

9. The speech recognition system as claimed in claim 7, wherein the reduced user dictionary creation unit compares a word in the user dictionary and the input speech, calculates a likelihood that the word appears in the input speech, and based on a calculation result, selects a word having a high likelihood to thereby create the reduced user dictionary.

10. The speech recognition system as claimed in claim 7, wherein the reduced user dictionary creation unit creates the reduced user dictionary by means of a word spotting method using the user dictionary.

11. A speech recognition method, comprising:

converting a speech into an electric signal and inputting the converted speech as an input speech into a speech input device;

extracting words related to the input speech from a user dictionary for speech recognition included in the speech input device to create a reduced user dictionary;

transmitting the input speech and the reduced user dictionary from the speech input device to a speech recognition device; and at the speech recognition device having received the input speech and the reduced user dictionary, performing speech recognition on the input speech based on a system dictionary for speech recognition included in the speech recognition device and the received reduced user dictionary, wherein the extracting includes:

comparing the input speech and a word in the user dictionary and compiling a likelihood of each word appearing in the input speech, temporarily storing a set of each word and a corresponding likelihood compiled, and selecting one or a plurality of words having high usage to thereby create the reduced user dictionary.

12. The speech recognition method as claimed in claim 11, wherein the reduced user dictionary is created by:

comparing words included in the user dictionary with the input speech, calculating likelihood of each word being present in the input speech, and selecting a word having high likelihood of being present in the input speech based on a result of the calculation.

13. The speech recognition method as claimed in claim 11, wherein the reduced user dictionary is created from the user dictionary by word spotting.

14. The speech recognition method as claimed in claim 11, wherein the reduced user dictionary is created by:
   comparing the input speech with words in the user dictionary,
   calculating likelihood of each word being present in the input speech,
   temporarily storing a set of the calculated likelihood and a corresponding word,
   selecting one or more words having high likelihood from temporarily-stored words, and
   editing the selected words to be in a form of a dictionary.

15. A speech recognition method, comprising:
   converting a speech into an electric signal and inputting the converted speech as an input speech into a speech input device;
   extracting words related to the input speech from a user dictionary for speech recognition included in the speech input device to create a reduced user dictionary;
   transmitting the input speech and the reduced user dictionary from the speech input device to a speech recognition device;
   receiving at the speech recognition device the input speech and the reduced user dictionary; and
   at the speech recognition device, performing speech recognition on the input speech based on a system dictionary for speech recognition included in the speech recognition device and the received reduced user dictionary,
   wherein the extracting includes:
   comparing the input speech and a word in the user dictionary and compiling a likelihood of each word appearing in the input speech,
   temporarily storing a set of each word and a corresponding likelihood compiled, and
   selecting one or a plurality of words having high usage to thereby create the reduced user dictionary.

16. The speech recognition method as claimed in claim 15, wherein the reduced user dictionary is created by:
   comparing words included in the user dictionary with the input speech,
   calculating likelihood of each word being present in the input speech, and
   selecting a word having high likelihood of being present in the input speech based on a result of the calculation.

17. The speech recognition method as claimed in claim 15, wherein the reduced user dictionary is created from the user dictionary by word spotting.

18. The speech recognition method as claimed in claim 15, wherein the reduced user dictionary is created by:
   comparing the input speech with words in the user dictionary,
   calculating likelihood of each word being present in the input speech,
   temporarily storing a set of the calculated likelihood and a corresponding word,
   selecting one or more words having high likelihood from temporarily-stored words, and
   editing the selected words to be in a form of a dictionary.

19. A non-transitory computer readable storage medium storing a speech recognition program, in a speech recognition system including a speech input device configured to input a speech as an input speech by converting the speech to an electric signal and a speech recognition device configured to take in and recognize the speech input to the speech input device, for causing a computer included in the speech input device to execute:
   converting speech into an electric signal and inputting the converted speech as input speech into the speech input device;
   extracting words related to the input speech from a user dictionary for speech recognition included in the speech input device to create a reduced user dictionary; and
   transmitting the input speech and the reduced user dictionary from the speech input device to a speech recognition device for performing speech recognition,
   wherein the extracting includes:
   comparing the input speech and a word in the user dictionary and compiling a likelihood of each word appearing in the input speech,
   temporarily storing a set of each word and a corresponding likelihood compiled, and
   selecting one or a plurality of words having high usage to thereby create the reduced user dictionary.

20. The non-transitory computer readable storage medium storing a speech recognition program as claimed in claim 19, wherein the reduced user dictionary is created by:
   comparing words included in the user dictionary with the input speech,
   calculating likelihood of each word being present in the input speech, and
   selecting a word having high likelihood of being present in the input speech based on a result of the calculation.

21. The non-transitory computer readable storage medium storing a speech recognition program as claimed in claim 19, wherein the reduced user dictionary is created by:
   comparing the input speech with words in the user dictionary,
   compiling likelihood of each word being present in the input speech,
   temporarily storing a set of the compiled likelihood and a corresponding word, and
   selecting one or more words having high likelihood from temporarily-stored words.

22. The non-transitory computer readable storage medium storing a speech recognition program as claimed in claim 19, wherein the reduced user dictionary is created from the user dictionary by word spotting.

23. A speech recognition system, comprising:
   speech input means for inputting a speech as an input speech by converting the speech to an electric signal; and
   speech recognition means for taking in and recognizing the speech input to the speech input device,
   wherein the speech input means and the speech recognition means are communicatively connected to each other,
   wherein the speech input means comprises:
   user dictionary means for storing words for use with recognition of the input speech; and
   reduced user dictionary creation means for creating a reduced user dictionary by extracting words corresponding to the input speech from the user dictionary section, and
   wherein the speech recognition means comprises:
   speech recognition means for
   inputting the input speech and the reduced user dictionary from the speech input means and
   recognizing the input speech based on the reduced user dictionary and a built-in system dictionary storing words for speech recognition, wherein the reduced user dictionary creation means includes:

a comparing section which compares the input speech and a word in the user dictionary and compiles a likelihood of each word appearing in the input speech, a word temporarily storing section which temporarily stores a set of each word and a corresponding likelihood compiled, and a word selection section which selects one or a plurality of words having high usage from the word temporarily storing section to thereby create the reduced user dictionary.

\* \* \* \* \*